(12) United States Patent
Biondini et al.

(10) Patent No.: US 9,181,424 B2
(45) Date of Patent: Nov. 10, 2015

(54) PROPYLENE POLYMER COMPOSITIONS

(71) Applicant: Basell Poliolefine Italia S.r.l., Milan (IT)

(72) Inventors: Gisella Biondini, Ferrara (IT); Marco Ciarafoni, Ferrara (IT); Paola Massari, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/349,711

(22) PCT Filed: Oct. 5, 2012

(86) PCT No.: PCT/EP2012/069675
§ 371 (c)(1),
(2) Date: Apr. 4, 2014

(87) PCT Pub. No.: WO2013/050507
PCT Pub. Date: Apr. 11, 2013

(65) Prior Publication Data
US 2015/0005438 A1 Jan. 1, 2015

Related U.S. Application Data

(60) Provisional application No. 61/545,532, filed on Oct. 10, 2011.

(30) Foreign Application Priority Data

Oct. 7, 2011 (EP) .................................... 11184248

(51) Int. Cl.
C08L 23/00 (2006.01)
C08L 23/10 (2006.01)
C08L 23/06 (2006.01)
C08L 23/14 (2006.01)

(52) U.S. Cl.
CPC ............... *C08L 23/14* (2013.01); *C08L 23/142* (2013.01); *C08L 2205/02* (2013.01); *C08L 2205/025* (2013.01); *C08L 2205/24* (2013.01); *C08L 2314/02* (2013.01)

(58) Field of Classification Search
CPC . C08L 23/14; C08L 23/142; C08L 2205/025; C08L 2314/02; C08L 2666/06; C08L 2205/02
USPC .......................................... 524/528; 525/240
See application file for complete search history.

(56) References Cited

U.S. PATENT DOCUMENTS

2002/0156194 A1* 10/2002 Pelliconi et al. .............. 525/240

FOREIGN PATENT DOCUMENTS

| WO | WO98/39384 A1 | 9/1998 |
|----|---------------|--------|
| WO | WO01/92406 A1 | 12/2001 |
| WO | WO03/046021 A1 | 6/2003 |
| WO | WO2008/088995 A1 | 7/2008 |

OTHER PUBLICATIONS

PCT International Search Report & Written Opinion mailed Oct. 25, 2012, for PCT/EP2012/069675.

* cited by examiner

Primary Examiner — Nathan M Nutter

(57) ABSTRACT

Propylene polymer compositions comprising:
A) from 70 wt % to 95 wt %, of a random copolymer of propylene with ethylene, containing from 1.5 wt % to 4.5 wt %, of ethylene derived units, having a content of fraction insoluble in xylene at 25° C. of not less than 93%;
B) from 5 wt % to 35 wt %, of a copolymer of propylene with ethylene, containing from 7.0 wt % to 17.0 wt % of ethylene derived units;
the sum A+B being 100;
wherein the melt flow rate, MFR. (Melt Flow Rate according to ASTM 1238, condition L, i.e. 230° C. and 2.16 kg load) ranges from 40 g/10 min and 130 g/10 min; and
wherein the relation (I) is fulfilled:

$$10 < XS*C2A - MFR/C2B < 30 \qquad (I)$$

wherein XS is the wt % of xylene soluble content at 25° C. of the total composition;
C2A is the wt % of ethylene derived units content of component A;
MFR is the melt flow rate of the total composition;
C2B is the wt % of ethylene derived units content of component B.

5 Claims, No Drawings

PROPYLENE POLYMER COMPOSITIONS

This application is the U.S. National Phase of PCT International Application PCT/EP2012/069675, filed Oct. 5, 2012, claiming priority of European Patent Application No. 11184248.0, filed Oct. 7, 2011, and the benefit under 35 U.S.C. 119(e) of U.S. Provisional Application No. 61/545,532 filed Oct. 10, 2011, the contents of which are incorporated herein by reference in their entirety.

FIELD OF INVENTION

The present invention relates to a propylene polymer composition having improved flexural modulus, impact strength and excellent optical properties.

BACKGROUND OF THE INVENTION

As is known, the isotactic polypropylene is endowed with an exceptional combination of excellent properties which render it suitable for a very great number of uses.

In order to improve the properties of the isotactic polypropylene the crystallinity of the propylene homopolymer is decreased by copolymerization of the propylene with small quantities of ethylene and/or α-olefins such as 1-butene, 1-pentene and 1-hexene. In this manner one obtains the so called random crystalline propylene copolymers which, when compared to the homopolymer, are essentially characterized by better flexibility and transparency.

Propylene random copolymers, however, although they have good transparency, do not offer, especially at low temperatures, sufficiently better impact resistance than the homopolymer which can be satisfactory used for the applications listed above.

It has been known for a long time that the impact resistance of polypropylene can be improved by adding an adequate quantity of elastomeric propylene-ethylene copolymer to the homopolymers by mechanical blending or sequential polymerization. However, this improvement is obtained at the expenses of the transparency of the material.

To avoid this inconvenient, U.S. Pat. No. 4,634,740 suggests the blending of the polypropylene, in the molten state, with propylene-ethylene copolymers obtained with specific catalysts, and having an ethylene content ranging from 70 to 85% by weight. However, said compositions present transparency values (Haze) substantially comparable to those of the propylene homopolymer. Said patent, therefore, does not teach how to obtain compositions having good transparency.

EP-A-0557953, describes polyolefin compositions where one obtains a good balance of transparency, stiffness, and impact resistance even at low temperatures, by modifying a crystalline random copolymer of propylene with the proper quantities of a mechanical mixture comprising an elastomeric copolymer and one or more polymers chosen from LLDPE, LDPE and HDPE.

WO 01/92406 describes a propylene polymer composition comprising (percent by weight):

A) from 70 to 90%, of a random copolymer of propylene with ethylene, containing from 1 to 6%, of ethylene, having a content of fraction insoluble in xylene at room temperature of not less than 93;

B) from 10% to 30%, of a copolymer of propylene with ethylene, containing from 8 to 18%, of ethylene;

wherein the ratio $(B)/C^2_B$ of the percent by weight of (B), with respect to the total weight of (A) and (B), to the percent by weight of ethylene in (B), with respect to the total weight of (B), represented in the above formula by $C^2_B$, is 2.5 or lower.

The MFR L ranges from 0.5 to 50 g/10 min. This composition shows a good transparency but quite low values of flexural modulus.

SUMMARY OF THE INVENTION

The applicant found a propylene polymer composition having a particular balance among the various parameter so that to obtain improved values of flexural modulus, good values of haze and good resistance to impact.

Thus one object of the present invention is a propylene polymer composition comprising:

A) from 70 wt % to 95 wt %, preferably from 74 wt % to 86 wt %, more preferably from of 77 wt % to 84 wt % of a random copolymer of propylene with ethylene, containing from 1.5 wt % to 4.5 wt %, preferably from 2.0 wt % to 3.5 wt %, of ethylene derived units, having a content of fraction insoluble in xylene at 25° C. of not less than 93 wt %, preferably not less than 94 wt %;

B) from 5 wt % to 35 wt %, preferably from 14 wt % to 26 wt %, more preferably from 16 wt % to 23 wt % of a copolymer of propylene with ethylene, containing from 7.0 wt % to 17.0 wt %, preferably from 8.0 wt % to 16 wt %, of ethylene derived units;

the sum A+B being 100;

wherein the melt flow rate, MFR. (ISO 1133 (230° C., 2.16 kg).) ranges from 30 g/10 min and 130 g/10 min; preferably from 40 g/10 min to 120 g/10 min; more preferably from 55 g/10 min to 110 g/10 min; even more preferably from 70 g/10 min to 100 g/10 min and wherein the relation (I) is fulfilled:

$$10 < XS^* C2A - MFR/C2B < 30 \quad (I)$$

wherein XS is the wt % of xylene soluble content at 25° C. of the total composition;

C2A is the wt % of ethylene derived units content of component A;

MFR is the melt flow rate of the total composition;

C2B is the wt % of ethylene derived units content of component B.

DETAILED DESCRIPTION OF THE INVENTION

Preferably relation (I) is $$15 < XS^* C2A - MFR/C2B < 28; \quad (Ia)$$

More preferably $$20 < XS^* C2A - MFR/C2B < 25; \quad (Ib).$$

Higher value of the relation correspond to unsatisfactory values of flexural modulus, while lower values of the relation correspond to unsatisfactory value of impact properties.

Preferably the ratio (B)/C2B wherein (B) is the amount wt % of B with respect to the total weight of (A) and (B) and C2B represents the wt % of ethylene derived units in B ranges from 2.5 to 1.5, preferably it is comprised between 1.8 and 2.4; more preferably between 2.1 and 2.3.

The term "copolymer" includes polymers containing only propylene and ethylene.

The present invention is preferably endowed with one or more of the following features:

Polydispersity Index (PI): 5 or less, more preferably 4 or less;

Intrinsic Viscosity [η] of the fraction (of the overall composition) insoluble in xylene at room temperature: from 1.5 to 3, more preferably from 2 to 2.5 dl/g;

Intrinsic Viscosity [η] of the fraction (of the overall composition) soluble in xylene at room temperature: from 1 to 4.5, more preferably from 1.5 to 4 dl/g.

The compositions of the present invention present at least one melt peak, determined by way of DSC (Differential Scanning Calorimetry), at a temperature higher than 140; preferably higher than 145° C.

Moreover, the compositions of the present invention preferably have one or more of the following features:
a Flexural Modulus higher than 800 MPa preferably higher than 880 and more preferably higher than 900 MPa, preferably the Flexural Modulus is lower than 1800 MPa, more preferably it is lower than 1500 MPa;
Haze less than 15% preferably less than 11% on 1 mm plaques;
fraction soluble in xylene at room temperature: less than 20%, more preferably less than 15%.

The compositions of the present invention can be prepared by sequential polymerization in at least two polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an Isotacticity Index greater than 90%, preferably greater than 95%.

Moreover, said catalysts must have a sensitivity to molecular weight regulators (particularly hydrogen) high enough to produce polypropylene having MFR values from less than 1 g/10 min. to 100 g/10 min. or more.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are 1,3-diethers of formula:

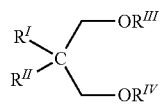

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl) fluorene.

By using the said dieters, the previously said preferred P.I. values are obtained directly in polymerization.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 m$^2$/g) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$ Si (OCH$_3$)$_2$, (cyclohexyl)(methyl) Si (OCH$_3$)$_2$, (phenyl)$_2$ Si (OCH$_3$)$_2$ and (cyclopentyl)$_2$ Si (OCH$_3$)$_2$. 1,3-diethers having the formulae described above can also be used advantageously. If the internal donor is one of these dieters, the external donors can be omitted.

As previously said, the polymerization process can be carried out in at least two sequential steps, wherein components A) and B) are prepared in separate subsequent steps, operating in each step, except the first step, in the presence of the polymer formed and the catalyst used in the preceding step. The catalyst is generally added only in the first step, however its activity is such that it is still active for all the subsequent step(s).

Component A) is preferably prepared before component B).

The regulation of the molecular weight is carried out by using known regulators, hydrogen in particular.

By properly dosing the concentration of the molecular weight regulator in the relevant steps, the previously described MFR and [η] values are obtained.

The whole polymerization process, which can be continuous or batch, is carried out following known techniques and operating in liquid phase, in the presence or not of inert diluent, or in gas phase, or by mixed liquid-gas techniques. It is preferable to carry out the propylene copolymerization step(s) for preparation of component A) in liquid propylene as diluent, and the other polymerization step(s) in gas phase. Generally there is no need for intermediate steps except for the degassing of unreacted monomers.

Reaction time, pressure and temperature relative to the two steps are not critical, however it is best if the temperature is from 20 to 100° C. The pressure can be atmospheric or higher.

The catalysts can be pre-contacted with small amounts of olefins (prepolymerization).

The compositions of the present invention can also be obtained by preparing separately the said components A) and B) by operating with the same catalysts and substantially under the same polymerization conditions as previously explained (except that a wholly sequential polymerization process will not be carried out, but the said components and fractions will be prepared in separate polymerization steps) and then mechanically blending said components and fractions in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The compositions of the present invention are particularly suited for the production of injection molding articles in particular containers, especially food containers. Due to the impact properties at low temperature the composition of the present invention is especially fit for the preparation of containers for frozen food such as ice cream, eggs, yoghurt, fish and frozen fish.

The particulars are given in the following examples, which are given to illustrate, without limiting, the present invention.

EXAMPLES

Methods of analysis used.
The data shown in the following Table are obtained by using the following test methods.
Melt Flow Rate
Determined according to ISO 1133 (230° C., 2.16 kg).
Ethylene Content of the Polymers (C2 Content)
Ethylene content has been determined by IR spectroscopy.
The spectrum of a pressed film of the polymer is recorded in absorbance vs. wavenumbers (cm$^{-1}$). The following measurements are used to calculate C2 content:
 a) Area ($A_t$) of the combination absorption bands between 4482 and 3950 cm$^{-1}$ which is used for spectrometric normalization of film thickness.
 b) Area ($A_{C2}$) of the absorption band due to methylenic sequences (CH$_2$ rocking vibration) after a proper digital subtraction of an isotactic polypropylene (IPP) reference spectrum. The range 660 to 790 cm$^{-1}$.
Molar Ratios of the Feed Gases
Determined by gas-chromatography.
Samples for the Mechanical Analysis
Samples have been obtained according to ISO 294-2
Flexural Modulus
Determined according to ISO 178.
Haze (on 1 mm Plaque)
According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method.
75×75×1 mm plaques are molded with a GBF Plastiniector G235190 Injection Molding Machine, 90 tons under the following processing conditions:
 Screw rotation speed: 120 rpm
 Back pressure: 10 bar
 Melt temperature: 260° C.
 Injection time: 5 sec
 Switch to hold pressure: 50 bar
 First stage hold pressure: 30 bar
 Second stage pressure: 20 bar
 Hold pressure profile: First stage 5 sec Second stage 10 sec
Cooling time: 20 sec
Mold water temperature: 40° C.

Melting Temperature, Melting Enthalpy and Crystallization Temperature

Determined by differential scanning calorimetry (DSC). A sample weighting 61 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures (Tm) and crystallization temperature (Tc) are read.

Xylene Soluble and Insoluble Fractions 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a ermostatic water bath at 25° C. for 30 minutes. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated. The percent by weight of polymer insoluble in xylene at room temperature is considered the Isotacticity Index of the polymer. This value corresponds substantially to the Isotacticity Index determined by extraction with boiling n-heptane, which by definition constitutes the Isotacticity Index of polypropylene.

Itrinsic Viscosity (I.V.)

Determined in tetrahydronaphthalene at 135° C.

IZOD Impact Strength

Determined according to ISO 180/1A

Solid Catalyst Component

The solid catalyst component used in polymerization is a highly stereospecific Ziegler-Natta catalyst component supported on magnesium chloride, prepared as follows.

Into a 500 mL four-necked round flask, purged with nitrogen, 250 mL of TiCl$_4$ were introduced at 0° C. While stirring, 10.0 g of microspheroidal MgCl$_2$*2.8C$_2$H$_5$OH (prepared according to the method described in ex.2 of U.S. Pat. No. 4,399,054 but operating at 3000 rpm instead of 10000 rpm) and 7.4 mmol of 9,9-bis(methoxymethyl)fluorene were added. The temperature was raised to 100° C. and maintained for 120 min. Then, the stirring was discontinued, the solid product was allowed to settle and the supernatant liquid was siphoned off. Then 250 mL of fresh TiCl$_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed. The resulting solid catalyst component contained: Ti=3.5% by weight, 9,9-bis(methoxymethyl)fluorene=18.1% by weight.

Catalyst System and Prepolymerization Treatment

Before introducing it into the polymerization reactors, the solid catalyst component described above is contacted at 15° C. for 30 minutes with aluminum triethyl (TEAL) in such quantity that the TEAL/Ti molar ratio be equal to 300.

The catalyst system is then subjected to prepolymerization by maintaining it in suspension in liquid at the conditions reported in table 1.

Polymerization

The polymerization runs were conducted in continuous in a series of two reactors equipped with devices to transfer the product from one reactor to the one immediately next to it. The first reactor is a liquid phase reactor, and the second is a fluid bed gas phase reactor.

Unless otherwise specified, temperature and pressure were maintained constant throughout the course of the reaction. Hydrogen was used as molecular weight regulator.

The gas phase (propylene, ethylene and hydrogen) is continuously analyzed via gas-chromatography.

At the end of the run the powder was discharged, stabilized following known techniques, dried in an oven at 60° C. under a nitrogen flow and pelletized. The polymerization parameters are reported in table 1.

TABLE 1

|  | Ex | | |
| --- | --- | --- | --- |
|  | 1 | 2 | 3 |
| Precontact | | | |
| Temperature ° C. | 12 | 12 | 12 |
| Residence time (min) | 23 | 22 | 21 |
| Teal/donor ratio | 4 | 4 | 3 |
| Prepolymerization | | | |
| Temperature ° C. | 20 | 20 | 20 |
| Residence time (min) | 9 | 9 | 9 |
| Loop 1$^{st}$ reactor in liquid phase - component A) | | | |
| Temperature, ° C. | 70 | 70 | 68 |
| Pressure, bar | 40 | 40 | 40 |
| Residence time, min | 57 | 56 | 53 |
| H$_2$ feed mol ppm | 7000 | 6800 | 8900 |
| C2 feed (kg/h) | 3 | 2.2 | 2.1 |
| C2- loop wt % | 3 | 2.6 | 2.5 |
| Xylene Solubles % | 5.1 | 3.8 | 4.2 |
| Split, wt % | 80 | 80 | 80 |
| Gas-Phase reactor - component B) | | | |
| Temperature, ° C. | 75 | 75 | 75 |
| Pressure, bar | 20 | 20 | 20 |
| Residence time, min | 23 | 40 | 34 |
| C$_2^-$/C$_2^-$ + C$_3^-$, % | 0.071 | 0.075 | 0.076 |
| H$_2$/C$_3^-$, % | 0.2 | 0.216 | 0.27 |
| Split, wt % | 20 | 20 | 20 |
| % C2- in copolymer | 9.5 | 10 | 10.5 |

C2$^-$ = ethylene;
C3$^-$ = propylene;
H2 = hydrogen

To the polymers of examples 1-3 the additives reported on table 2 were added. The analysis of the resulting polymers is reported in table 3.

TABLE 2

| Additive | Amount (ppm) |
| --- | --- |
| Irganox 1010 | 500 |
| Irgafos 168 | 1000 |
| Ca Stearate | 500 |
| GMS 90 | 1750 |
| Millad 3998 | 1800 |

Comparative Example 1

Comparative example 4 is example 2 of WO 01/92406.

TABLE 3

|  |  | Example 1 | Example 2 | Example 3 | Comparative ex 4 |
|---|---|---|---|---|---|
| Component A) | | | | | |
| MFR | g/10' | 46 | 45 | 75 | 2.2 |
| C2 | % | 3.0 | 2.6 | 2.1 | 2.8 |
| Xylene Soluble (XS) | % | 5.1 | 3.8 | 4.2 | 5.3 |
| Component B) | | | | | |
| % C2 bipolymer by calc. | % | 9.5 | 10 | 10.5 | 13.5 |
| Split (amount of component B). | % | 20 | 20 | 20 | 19 |
| Total composition | | | | | |
| MFR | g/10' | 45 | 48 | 86 | 1.7 |
| C2 | % | 4.6 | 3.7 | 4.4 | 4.8 |
| Xylene Soluble (XS) total | % | 11.2 | 8 | 11.9 | 13 |
| Characterization | | | | | |
| Flexural Modulus | MPa | 920 | 1143 | 957 | 740 |
| Izod impact @23° C. | kJ/m$^2$ | 5.2 | 4.1 | 4.2 | nm |
| Tens. Str.@ yield | MPa | 25.5 | 29.6 | 26.4 | nm |
| Elong.@ break | % | 854 | 478 | 985 | nm |
| HAZE (plaque 1 mm) | % | 10.3 | 14.8 | 11.3 | 9.8 |
| Tm | °C. | 148 | 152.5 | 151 | 149.7 |
| Tc | °C. | 114 | 115.9 | 117 | 114.8 |
| Hm | J/g | 77 | 84.3 | 79 | 71.2 |
| XS * C2A-MFR/C2B | | 28.9 | 16 | 16.8 | 36.3 |
| (B)/C2B | | 2.1 | 2 | 1.9 | 1.4 |

C2 = ethylene;
C3 = propylene;
nm = not measured

From table 2 clearly results that the composition according to the present invention shows an improved flexural modulus with the about same value of haze.

What is claimed is:

1. A propylene polymer composition comprising:
   A) from 70 wt. % to 95 wt. %, of a random copolymer of propylene and ethylene derived units, wherein the random copolymer of propylene and ethylene contains from 1.5 wt. % to 4.5 wt. %, of ethylene derived units based upon the total weight of the random copolymer of propylene and ethylene, and has a content of fraction insoluble in xylene at 25° C. of not less than 93 wt. %;
   B) from 5 wt. % to 35 wt. %, of a copolymer of propylene and ethylene derived units, wherein the copolymer of propylene and ethylene contains from 7.0 wt % to 17.0 wt % of ethylene derived units based upon the total weight of the copolymer of propylene and ethylene;
   wherein the sum A+B is 100;
   wherein the propylene polymer composition has a melt flow rate, MFR (ISO 1133 (230° C., 2.16 kg)) ranges from 55 to 130 g/10 min; and
   wherein the relation (I) is fulfilled:

$$10 < XS*C2A - MFR/C2B < 30 \qquad (I)$$

wherein XS is the wt % of xylene soluble content at 25° C. of the total composition;
   C2A is the wt % of ethylene derived units content of component A;
   MFR is the melt flow rate of the total composition;
   C2B is the wt % of ethylene derived units content of component B.

2. The propylene polymer composition of claim 1, wherein the propylene polymer composition has a MFR of from 70 to 120 g/10 min.

3. The propylene polymer composition of claim 1 wherein the ratio (B)/C2B wherein (B) is the amount wt. % of B with respect to the total weight of (A) and (B) and C2B represents the wt. % of ethylene derived units in B ranges from 2.5 to 1.5.

4. The propylene polymer composition of claim 1, wherein the propylene polymer composition further comprises a nucleating agent.

5. An injection molded article comprising a propylene polymer composition comprising:
   A) from 70 wt. % to 95 wt. %, of a random copolymer of propylene and ethylene derived units, wherein the random copolymer of propylene and ethylene contains from 1.5 wt. % to 4.5 wt. %, of ethylene derived units based upon the total weight of the random copolymer of propylene and ethylene, and has a content of fraction insoluble in xylene at 25° C. of not less than 93 wt. %;
   B) from 5 wt. % to 35 wt. %, of a copolymer of propylene and ethylene derived units, wherein the copolymer of propylene and ethylene contains from 7.0 wt. % to 17.0 wt. % of ethylene derived units based upon the total weight of the copolymer of propylene and ethylene;
   wherein the sum A+B is 100;
   wherein the propylene polymer composition has a melt flow rate, MFR (ISO 1133 (230° C., 2.16 kg)) ranges from 55 to 130 g/10 min; and
   wherein the relation (I) is fulfilled:

$$10 < XS*C2A - MFR/C2B < 30 \qquad (I)$$

wherein XS is the wt. % of xylene soluble content at 25° C. of the total composition;
   C2A is the wt. % of ethylene derived units content of component A;
   MFR is the melt flow rate of the total composition;
   C2B is the wt. % of ethylene derived units content of component B.

* * * * *